(12) United States Patent
Barnhart (10) Patent No.: US 11,046,066 B2
(45) Date of Patent: Jun. 29, 2021

(54) ADDITIVE MANUFACTURING APPARATUS AND METHOD

(71) Applicant: General Electric Compnay, Schenectady, NY (US)

(72) Inventor: David Richard Barnhart, Jefferson, OH (US)

(73) Assignee: General Electric Company, Schenectady, NY (US)

( * ) Notice: Subject to any disclaimer, the term of this patent is extended or adjusted under 35 U.S.C. 154(b) by 54 days.

(21) Appl. No.: 16/406,486

(22) Filed: May 8, 2019

(65) Prior Publication Data

US 2019/0263106 A1 Aug. 29, 2019

Related U.S. Application Data

(62) Division of application No. 14/698,218, filed on Apr. 28, 2015, now Pat. No. 10,315,408.

(51) Int. Cl.
*B33Y 30/00* (2015.01)
*B28B 1/00* (2006.01)
(Continued)

(52) U.S. Cl.
CPC .............. *B33Y 30/00* (2014.12); *B22F 12/00* (2021.01); *B23K 15/0086* (2013.01); *B23K 26/342* (2015.10); *B28B 1/001* (2013.01); *B29C 64/153* (2017.08); *B22F 10/10* (2021.01); *B29L 2031/772* (2013.01); *Y02P 10/25* (2015.11)

(58) Field of Classification Search
CPC ..... B29C 64/153; B29C 64/245; B29C 64/35; B29C 64/357; B22F 3/1055; B22F 2003/1059; B22F 2003/1056
See application file for complete search history.

(56) References Cited

U.S. PATENT DOCUMENTS 5,753,274 A 5/1998 Wilkening et al.
5,846,370 A 12/1998 O'Connor
(Continued)

FOREIGN PATENT DOCUMENTS

CN 102029389 A 4/2011
JP 2013-075389 A 4/2013
WO 2014009376 A1 1/2014

OTHER PUBLICATIONS

European Search Report and Opinion issued in connection with corresponding EP Application No. 16167177.1 dated Nov. 11, 2016.
(Continued)

*Primary Examiner* — Xiao S Zhao
*Assistant Examiner* — Emmanuel S Luk
(74) *Attorney, Agent, or Firm* — Dinsmore & Shohl LLP (57) ABSTRACT

A method of making a part includes the steps of: securing a build platform to an actuator which is disposed in a build chamber, depositing a powder onto the build platform; directing a beam from a directed energy source to fuse the powder; moving the actuator vertically downward within the build chamber by a layer increment of powder; repeating in a cycle the steps of depositing, directing, and moving to build up the part in a layer-by-layer fashion until the part is complete; lifting the build platform away from the actuator to create an opening therebetween; and evacuating the powder from the build chamber through the opening.

20 Claims, 5 Drawing Sheets

(51) Int. Cl.
    *B23K 15/00*     (2006.01)
    *B23K 26/342*     (2014.01)
    *B29C 64/153*     (2017.01)
    *B22F 3/105*     (2006.01)
    *B22F 12/00*     (2021.01)
    *B29L 31/00*     (2006.01)
    *B22F 10/10*     (2021.01)

(56) References Cited

U.S. PATENT DOCUMENTS

| | | | |
|---|---|---|---|
| 5,876,550 | A | 3/1999 | Feygin et al. |
| 6,042,774 | A | 3/2000 | Wilkening et al. |
| 6,095,789 | A | 8/2000 | Hepler et al. |
| 6,169,605 | B1 | 1/2001 | Penn et al. |
| 6,554,600 | B1 | 4/2003 | Hofmann et al. |
| 7,131,833 | B2 | 11/2006 | Babin |
| 7,204,684 | B2 | 4/2007 | Ederer et al. |
| 7,351,051 | B2 | 4/2008 | Hagiwara |
| 7,357,629 | B2 | 4/2008 | Weiskopf et al. |
| 7,491,912 | B1 | 2/2009 | Kleinerman |
| 7,862,320 | B2 | 1/2011 | Kumagai et al. |
| 7,874,445 | B2 | 1/2011 | Hochsmann et al. |
| 7,976,302 | B2 | 7/2011 | Haider et al. |
| 8,031,384 | B2 | 10/2011 | Perret et al. |
| 8,070,474 | B2 | 12/2011 | Abe et al. |
| 8,187,522 | B2 | 5/2012 | Higashi et al. |
| 8,550,802 | B2 | 10/2013 | Fuwa et al. |
| 8,568,124 | B2 | 10/2013 | Brunermer |
| 8,753,105 | B2 | 6/2014 | Scott |
| 8,905,744 | B2 | 12/2014 | Fruth |
| 8,992,205 | B2 | 3/2015 | Ederer et al. |
| 9,662,840 | B1 | 5/2017 | Buller et al. |
| 9,676,145 | B2 | 6/2017 | Buller et al. |
| 9,989,495 | B2 | 6/2018 | Gold et al. |
| 10,166,603 | B2 | 1/2019 | Kawada et al. |
| 2002/0195746 | A1 | 12/2002 | Hull et al. |
| 2004/0084814 | A1 | 5/2004 | Boyd et al. |
| 2006/0219315 | A1 | 10/2006 | Cox |
| 2007/0001342 | A1 | 1/2007 | Oberhofer et al. |
| 2007/0026102 | A1 | 2/2007 | Devos et al. |
| 2007/0026145 | A1 | 2/2007 | Lindemann et al. |
| 2007/0063372 | A1 | 3/2007 | Nielsen et al. |
| 2007/0087071 | A1 | 4/2007 | Devos et al. |
| 2007/0126157 | A1 | 6/2007 | Bredt |
| 2007/0245950 | A1 | 10/2007 | Teulet |
| 2007/0298182 | A1 | 12/2007 | Perret et al. |
| 2008/0190905 | A1 | 8/2008 | Heinlein |
| 2008/0211132 | A1 | 9/2008 | Feenstra |
| 2008/0230414 | A1 | 9/2008 | Perret et al. |
| 2008/0241404 | A1 | 10/2008 | Allaman et al. |
| 2009/0011066 | A1 | 1/2009 | Davidson et al. |
| 2011/0052386 | A1 | 3/2011 | Schoonover et al. |
| 2011/0135952 | A1 | 6/2011 | Morris et al. |
| 2011/0165340 | A1 | 7/2011 | Baumann |
| 2011/0311389 | A1 | 12/2011 | Ryan et al. |
| 2012/0211155 | A1 | 8/2012 | Wehning et al. |
| 2012/0222306 | A1 | 9/2012 | Mittendorf et al. |
| 2014/0314964 | A1 | 10/2014 | Ackelid |
| 2015/0202687 | A1 | 7/2015 | Pialot et al. |
| 2015/0210007 | A1 | 7/2015 | Durand et al. |
| 2015/0246485 | A1 | 9/2015 | Guenster et al. |
| 2015/0258744 | A1 | 9/2015 | Muller et al. |
| 2015/0328824 | A1 | 11/2015 | Morikami et al. |
| 2016/0318102 | A1 | 11/2016 | Barnhart |
| 2017/0080641 | A1 | 3/2017 | El-Siblani |
| 2018/0056391 | A1 | 3/2018 | Buller et al. |
| 2018/0111193 | A1 | 4/2018 | Romano et al. |
| 2019/0009332 | A1 | 1/2019 | Rockstroh |
| 2019/0009338 | A1 | 1/2019 | McMurtry et al. |
| 2019/0160753 | A1* | 5/2019 | Corsini .............. B29C 64/245 |

OTHER PUBLICATIONS

First Office Action and Search issued in connection with corresponding CN Application No. 201610273117.6 dated Nov. 8, 2017.

* cited by examiner

ND METHOD

BACKGROUND OF THE INVENTION

This invention relates generally to additive manufacturing apparatus and more particularly to build enclosures for additive manufacturing.

"Additive manufacturing" is a term used herein to describe a process which involves layer-by-layer construction or additive fabrication (as opposed to material removal as with conventional machining processes). Such processes may also be referred to as "rapid manufacturing processes". Additive manufacturing processes include, but are not limited to: Direct Metal Laser Melting (DMLM), Laser Net Shape Manufacturing (LNSM), electron beam sintering, Selective Laser Sintering (SLS), 3D printing, such as by inkjets and laserjets, Stereolithography (SLA), Electron Beam Melting (EBM), Laser Engineered Net Shaping (LENS), and Direct Metal Deposition (DMD).

Currently, powder bed technologies have demonstrated the best resolution capabilities of prior art metal additive manufacturing technologies. However, since the build needs to take place in the powder bed, conventional machines use a large amount of resident powder, for example a powder load can be over 130 kg (300 lbs.). This is costly when considering a factory environment using many machines. The powder that is not directly melted into the part but stored in the neighboring powder bed is problematic because it adds weight to the elevator systems, complicates seals and chamber pressure problems, is detrimental to part retrieval at the end of the part build, and becomes unmanageable in large bed systems currently being considered for large components.

Furthermore, currently available additive manufacturing systems are geared for prototyping and very low volume manufacturing. Considerable differences can exist from part-to-part. Some elements of current systems are cumbersome to handle due to weight and can require excessive manual, hands-on interaction.

Accordingly, there remains a need for an additive manufacturing apparatus and method that can produce parts at a high volume with consistent quality.

BRIEF SUMMARY OF THE INVENTION

This need is addressed by the present invention, which provides an additive manufacturing apparatus having a build chamber enclosing an actuator with a build platform releasably secured thereto. The build platform can be separated from the actuator to permit removal of excess powder and/or removal of a completed part.

According to one aspect of the invention, a method of making a part includes the steps of: securing a build platform to an actuator which is disposed in a build chamber, depositing a powder onto the build platform; directing a beam from a directed energy source to fuse the powder; moving the actuator vertically downward within the build chamber by a layer increment of powder; repeating in a cycle the steps of depositing, directing, and moving to build up the part in a layer-by-layer fashion until the part is complete; lifting the build platform away from the actuator to create an opening therebetween; and evacuating the powder from the build chamber through the opening.

According to another aspect of the invention, a method of making a series of parts, includes the steps of: securing a build platform to an actuator which is disposed in a build chamber, executing a build cycle including depositing powder onto the build platform and selectively fusing the powder using directed energy, for a plurality of layers, until the part is complete; lifting the build platform away from the actuator to create an opening therebetween; evacuating the powder from the build chamber through the opening; detaching the build platform from the actuator; and repeating the steps of securing, executing a build cycle, lifting, evacuating, and detaching so as to complete at least one subsequent part.

BRIEF DESCRIPTION OF THE DRAWINGS

The invention may be best understood by reference to the following description taken in conjunction with the accompanying drawing figures, in which.

DETAILED DESCRIPTION OF THE INVENTION

Figure 1:
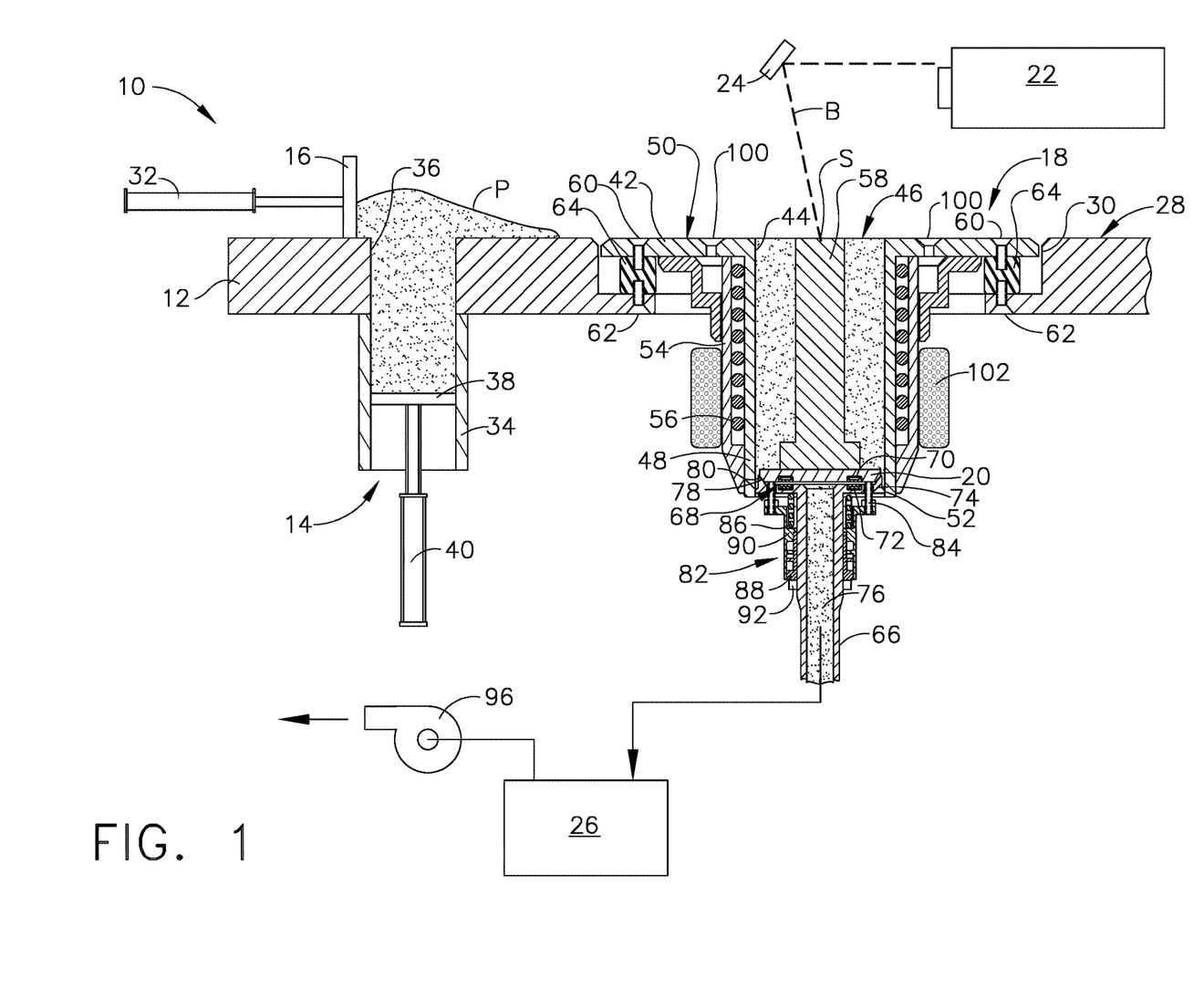
FIG. 1 is a schematic of an additive manufacturing apparatus constructed according to an aspect of the present invention.
Figure 2:
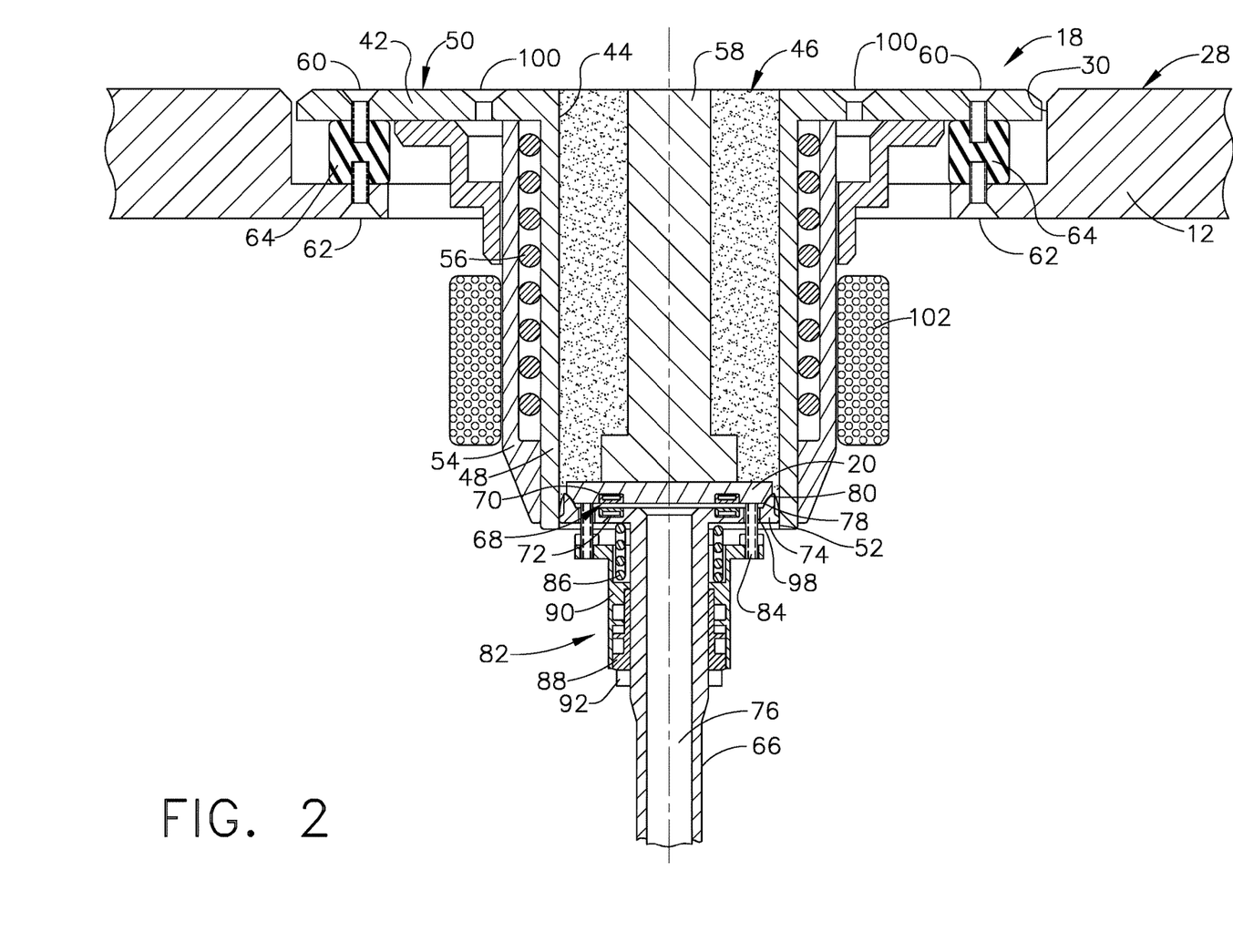
FIG. 2 is cross-sectional view of a build enclosure of the additive manufacturing apparatus of FIG. 1 in a seated position.
Figure 3:
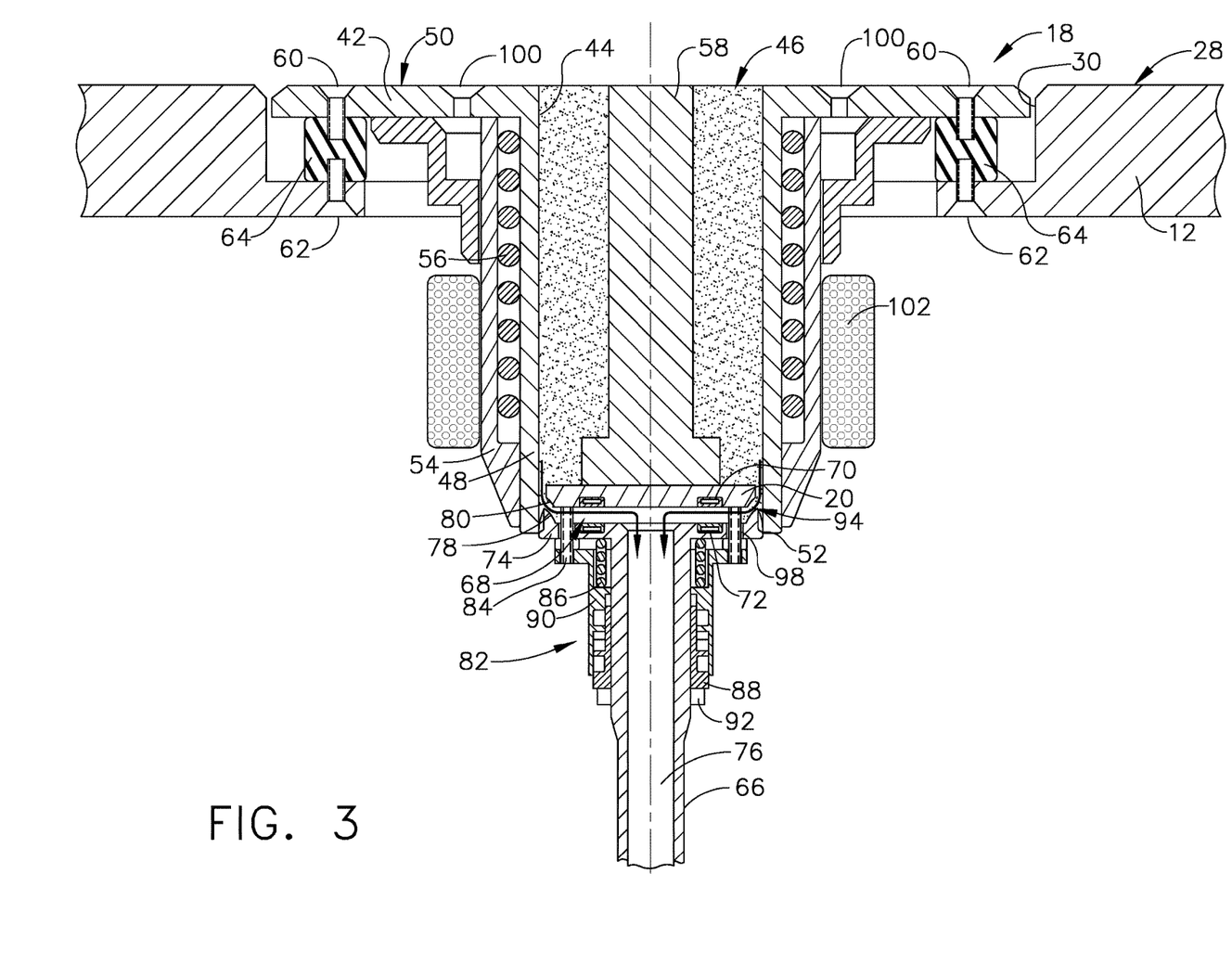
FIG. 3 is a cross-sectional view of the build enclosure in an un-seated position.

Referring to the drawings wherein identical reference numerals denote the same elements throughout the various views, FIGS. 1-3 illustrate an additive manufacturing apparatus 10 for carrying out the manufacturing method of the present invention. The basic components are a table 12, a powder supply 14, an applicator 16, a build enclosure 18 surrounding a build platform 20, a directed energy source 22, a beam steering apparatus 24, and a powder recovery container 26. Each of these components will be described in more detail below.

The table 12 is a rigid structure providing a planar worksurface 28. The worksurface 28 is coplanar with and defines a virtual workplane. In the illustrated example it includes an opening 30 for receiving the build enclosure 18 therein.

The applicator 16 is a rigid, laterally-elongated structure that lies on the worksurface 28. It is connected to an actuator 32 operable to selectively move the applicator 16 along the worksurface 28. The actuator 32 is depicted schematically in FIG. 1, with the understanding devices such as pneumatic or hydraulic cylinders, ballscrew or linear electric actuators, and so forth, may be used for this purpose.

The powder supply 14 comprises a supply container 34 underlying and communicating with supply opening 36, and an elevator 38. The elevator 38 is a plate-like structure that is vertically slidable within the supply container 34. It is connected to an actuator 40 operable to selectively move the elevator 38 up or down. The actuator 40 is depicted schematically in FIG. 1, with the understanding that devices such as pneumatic or hydraulic cylinders, ballscrew or linear electric actuators, and so forth, may be used for this purpose. When the elevator 38 is lowered, a supply of powder "P" of a desired alloy composition may be loaded into the supply container 34. When the elevator 38 is raised, it exposes the powder P above the worksurface 28. It should be appreciated that the powder used in the current invention may be of any suitable material for additive manufacturing. For example, the powder may be a metallic, polymeric, organic, or ceramic powder.

The build enclosure 18 is positioned in the opening 30 and includes an upper platform 42 defining an upper opening 44 of a build chamber 46 and an inner side wall 48 extending downwardly from the upper platform 42. The upper platform 42 provides a planar worksurface 50 substantially level with the worksurface 28 to permit the applicator to push powder over the upper platform 42 and into the build chamber 46. The side wall 48 defines the build chamber 46 and a lower opening 52. As illustrated, the build chamber 46 extends the length of the inner side wall 48 from the lower opening 52 to the upper opening 44. An outer side wall 54 extends around inner side wall 48 and is connected thereto. The inner and outer side walls 48 and 54 define an opening therebetween for receiving a chamber heater 56 therein configured to maintain a selected temperature in the build chamber 46 and promote dimensional stability of part 58 being formed in the build chamber 46. The upper platform 42 may also include powder collection valleys 100 to capture loose powder outside build chamber 46. The chamber heater 56 may be any type of heater capable of being positioned between the inner and outer side walls 48 and 54 and heating the build chamber 46. For example, the chamber heater 56 may be an induction type heater.

The build enclosure 18 is secured in the opening 30 by upper and lower fasteners 60 and 62. As illustrated, chamber mounts 64 or spacers are positioned between the upper platform 42 and the table 12 to isolate the build enclosure 18 from the table 12 and permit movement of the build enclosure 18 relative to the table 12. The upper fasteners 60 extend through the upper platform 42 and terminate in the chamber mounts 64 to secure the build enclosure 18 to the chamber mounts 64 and the lower fasteners 62 extend through the table 12 and terminate in the chamber mounts 64 to secure the chamber mounts 64 to the table 12, thereby securing the build enclosure 18 to the table 12. The chamber mounts 64 may be formed of any material with isolation and/or resilient properties, such as rubber, suitable to secure the build enclosure 18 to the table 12, provide isolation therebetween, and allow movement of the build enclosure 18 relative to the table 12.

The build platform 20 is a plate-like structure that is vertically slidable in the build chamber 46 below the upper opening 44. The build platform is secured to an end mount of an actuator 66 that is operable to selectively move the build platform 20 up or down. The actuator 66 is depicted schematically in FIG. 1, with the understanding that devices such as pneumatic or hydraulic cylinders, ballscrew or linear electric actuators, and so forth, may be used for this purpose.

The build platform 20 may be releasably secured to the actuator 66 by a securing means 68. As used herein, the term "releasably secured" refers to a connection which retains the build platform 20 in place under normally-expected operating force, but permits the build platform 20 to be removed or disconnected from the actuator 66 without requiring tools to disassemble the build platform 20 or surrounding structures. As illustrated, the securing means 68 includes upper and lower magnets 70 and 72. Upper magnet 70 is carried by the build platform 20 and lower magnet 72 is carried by the actuator 66. The upper and lower magnets 70 and 72 are polar opposites to provide a magnetic attraction therebetween, thereby securing the build platform 20 to the actuator 66. Alternatively, magnets could be included only on the build platform 70 if the actuator 66 is magnetic, or just the actuator 66 if the build platform 20 is magnetic.

The actuator 66 extends through the lower opening 52 and into the build chamber 46. The actuator 66 includes a seal 74 and a vacuum chamber 76. The seal 74 extends around a perimeter of the actuator 66 and is configured for sealing engagement with the inner wall 48 to prevent powder from escaping the build chamber 46 through lower opening 52. The seal 74 includes a chamfered inner surface 78 configured for mating engagement with a chamfered outer surface 80 of the build platform 20. The chamfered surfaces 78 and 80 allow the build platform 20 to be self-centering within the build chamber 46.

The vacuum chamber 76 is centrally located along a length of the actuator 66 and is configured to remove unused powder contained in the build chamber 46 from the build chamber 46 once a part 58 has been completed. Vacuum chamber 76 may also be operably connected to powder collection valleys 100 to evacuate unused powder from the powder collection valleys 100 once the part 58 has been completed.

A platform lift 82 is carried by the actuator 66 and includes lifting pins 84, spring 86, fixed sleeve 88, sliding sleeve 90, and a lift retainer 92. The platform lift 82 is configured to lift the build platform 20 from the actuator 66, thereby separating the upper and lower magnets 70 and 72 and creating an opening 94 between the build platform 20 and the seal 74 to permit unused powder in the build chamber 46 to be evacuated from the build chamber 46 into powder recovery container 26 via the vacuum chamber 76, see FIGS. 2 and 3. As illustrated, FIG. 1, vacuum is created by vacuum pump 96 to remove the unused powder.

Figure 5:
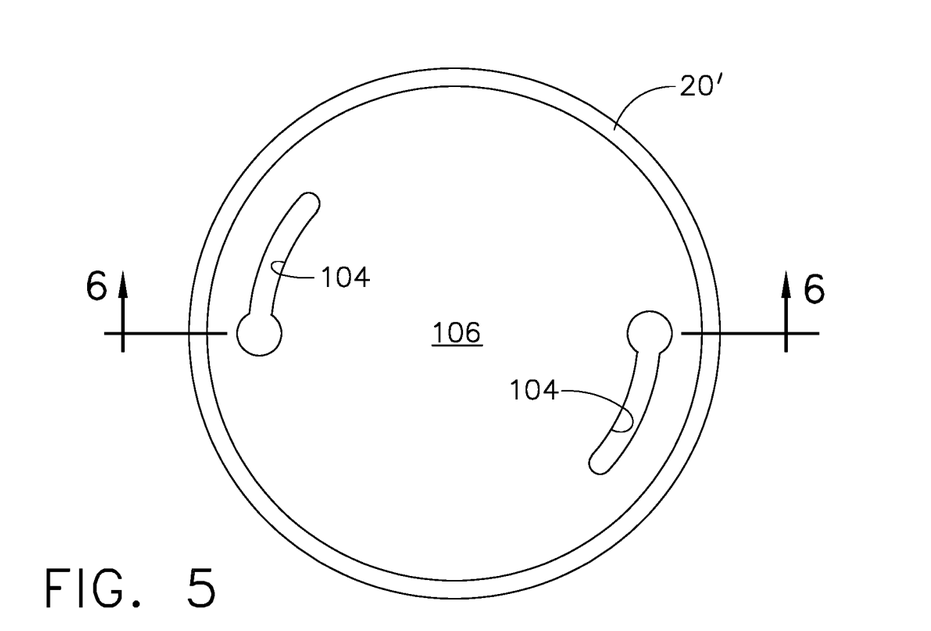
FIG. 5 is a bottom plan view of an alternative build platform.
Figure 6:
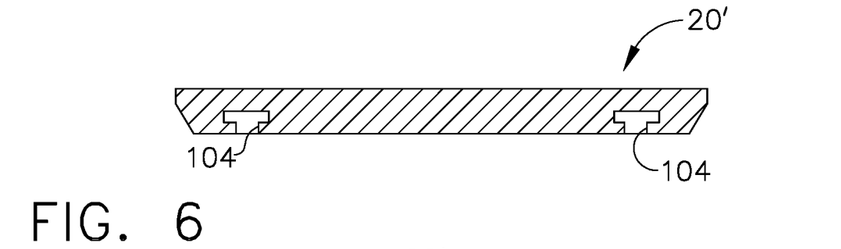
FIG. 6 is a view taken along lines 6-6 of FIG. 5.
Figure 7:
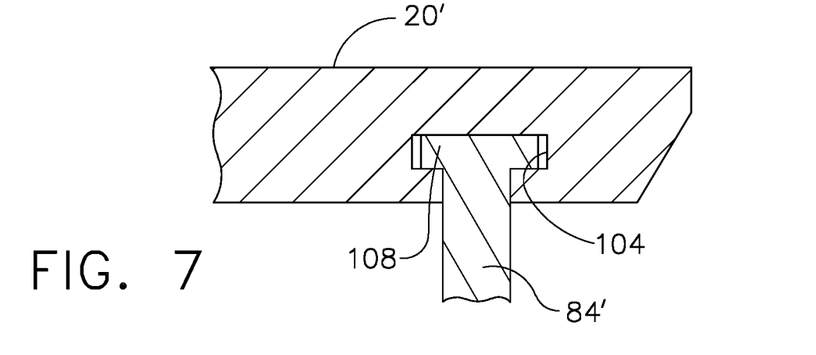
FIG. 7 is a cross-sectional view of a portion of the build platform of FIG. 5, with a lift pin engaged in a slot.

The platform lift 82 may be pneumatic or actuated by any other suitable means. As shown, the lift retainer 92 is secured to the actuator 66 and is configured to prevent the platform lift 82 from moving vertically downward along the actuator 66. The fixed sleeve 88 rests against the lift retainer 92 and prevents the sliding sleeve 90 from moving downwardly beyond the lift retainer 92. Lifting pins 84 are connected to the sliding sleeve 90 and extend upwardly through apertures 98 in the actuator 66 to operably lift the build platform 20. The sliding sleeve 90 is slidably connected to the fixed sleeve 88 and is configured to move vertically upward from a first position, FIG. 2, to a second position, FIG. 3, where the sliding sleeve 90 forces the lifting pins 84 upwardly against the build platform 20 causing the build platform 20 to move vertically upward from the actuator 66, thereby separating upper and lower magnets 70 and 72. As an alternative to the magnets 70 and 72, the build platform 20 could be connected to the actuator 66 using a mechanical quick-connect/disconnect structure. For example, FIGS. 5 and 6 illustrate an alternative build platform 20' having a pair of diametrically-opposed, keyhole slots 104 formed in its lower surface 106. A modified platform lift would be provided with lifting pins 84', seen in FIG. 7, having enlarged heads 108 sized to fit the wide portion of the T-shaped keyhole slots 104. The platform lift 20' can then be easily engaged or disengaged from the lifting pins 84' by rotating it a portion of a turn. This arrangement, or equivalent mechanical coupling, would be especially useful in the case where the powder is magnetic, to prevent accumulation of powder around the build platform, platform lift, and actuator. Spring 86 is positioned between sliding sleeve 90 and actuator 66 to force the sliding sleeve 90 from the second position, FIG. 3, to the first position, FIG. 2, when the platform lift 82 is not being actuated to move the build platform 20.

FIG. 3 depicts the platform lift 82 being actuated at the actuator's lowest position within the build chamber 46. However, alternatively, the platform lift 82 could be actuated while synchronously moving the actuator 66 downward at the same rate that the platform lift 82 moves upwards. This would have the effect of creating the opening 94 while the build platform 20 remains at its last vertical position relative to the build chamber 46. Using this process, the powder can be evacuated regardless of where the build ends and where the actuator position is relative to the chamber top or bottom.

Alternatively, rather than requiring the lift mechanism 82 to lift the relatively heavy part and powder load of the build chamber 46, the build platform 20 may be used to support and/or stabilize the chamber load while the actuator 66 may be permitted to move vertically downward so that upper and lower magnets may be separated to permit evacuation of unused powder from the build chamber 46.

Figure 4:
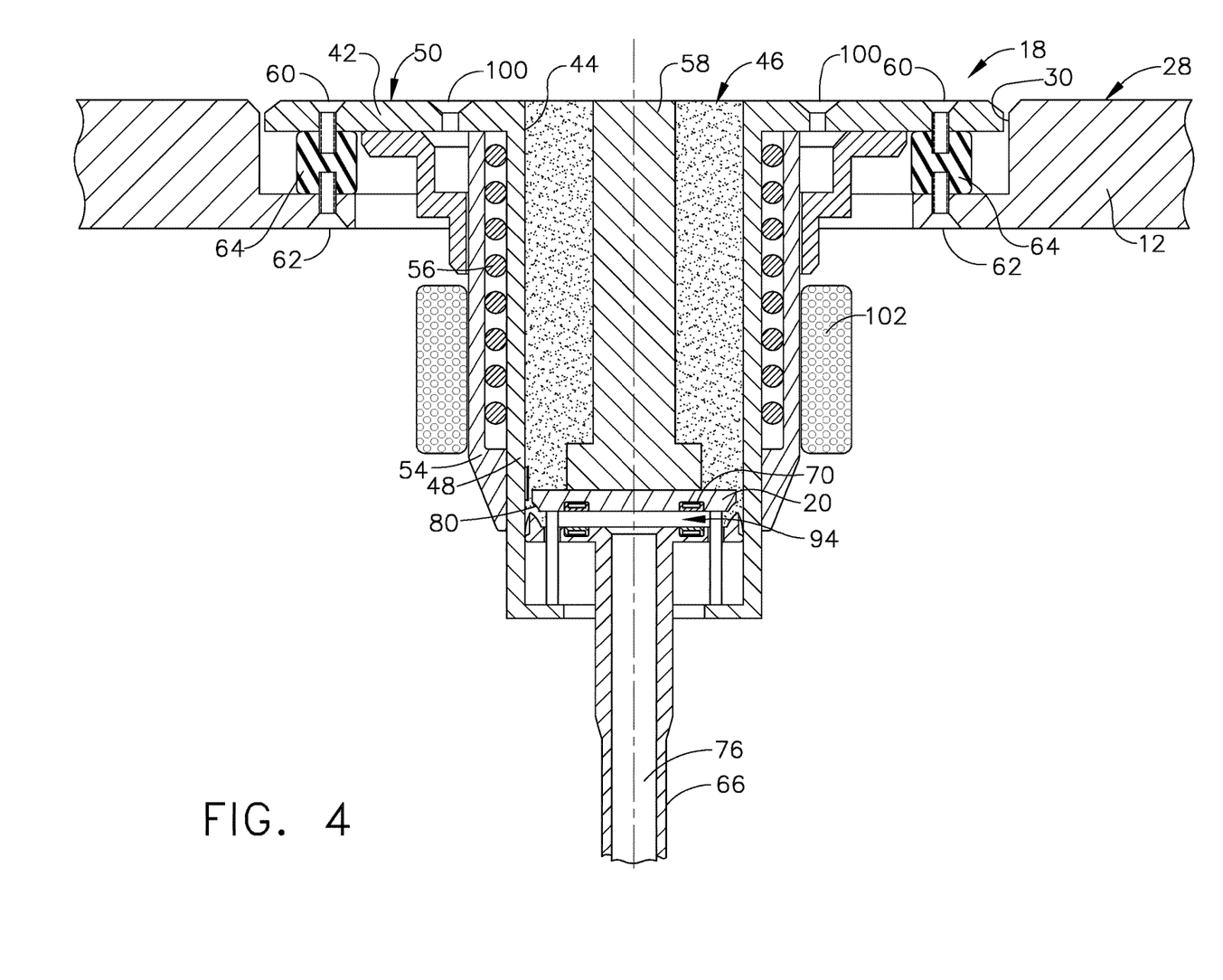
FIG. 4 is a cross-sectional view of the build enclosure with an alternative build platform separation mechanism.

FIG. 4 shows an example of how this may be accomplished by eliminating the lift mechanism 82 and using appropriately-positioned, statically-mounted lifting pins. In FIG. 4, one or more lateral protrusions 91 (such as individual tabs or an annular flange) may extend inward from the side wall 48 of the build chamber 46, at or near its lower end. The lateral protrusion 91 has one or more statically-mounted lifting pins 84" extending upwards therefrom. When the actuator 66 is lowered, the lifting pins 84" extend through holes in the actuator 66 and contact the build platform 20. The lifting pins 84" support the build platform 20 and prevent it from descending as the actuator 66 is lowered further. The separation of the build platform 20 and the actuator 66 creates the opening 94 for powder evacuation described above.

Optionally, a chamber shaker 102 may be positioned around the outer wall 54 to shake or impart vibrations into build enclosure 18 to help evacuate the build chamber 46 of unused powder. The chamber mounts 64 isolate the build enclosure 18 from the table 12 and allow the build enclosure 18 to be moved by the chamber shaker 102 without affecting the table 12. The chamber shaker 102 may be any suitable shaker configured to help evacuate powder from the build chamber 46. For example, the chamber shaker 102 may be a mechanical shaker that moves the build enclosure 18 rapidly or an ultrasonic type of shaker that sends vibrations through the build enclosure 18.

The directed energy source 22 may comprise any known device operable to generate a beam of suitable power and other operating characteristics to melt and fuse the powder during the build process, described in more detail below. For example, the directed energy source 22 may be a laser. Other directed-energy sources such as electron beam guns are suitable alternatives to a laser.

The beam steering apparatus 24 comprises one or more mirrors, prisms, and/or lenses and provided with suitable actuators, and arranged so that a beam "B" from the directed energy source 22 can be focused to a desired spot size and steered to a desired position in an X-Y plane coincident with the worksurface 50.

The build process for a part 58 using the apparatus 10 described above is as follows. The build platform 20 is secured to the actuator 66 and is moved to an initial high position. The initial high position is located below the worksurface 50 by a selected layer increment. The layer increment affects the speed of the additive manufacturing process and the resolution of the part 58. As an example, the layer increment may be about 10 to 50 micrometers (0.0004 to 0.002 in.). Powder "P" is then deposited over the build platform 20. For example, the elevator 38 of the supply container 34 may be raised to push powder through the supply opening 36, exposing it above the worksurface 28. The applicator 16 is moved across the worksurface to spread the raised powder P horizontally over the build platform 20. Any excess powder P drops into powder collection valleys 100 as the applicator 16 passes from left to right. Subsequently, the applicator 16 may be retracted back to a starting position.

The directed energy source 22 is used to melt a two-dimensional cross-section or layer of the part 58 being built. The directed energy source 22 emits a beam "B" and the beam steering apparatus 24 is used to steer the focal spot "S" of the beam B over the exposed powder surface in an appropriate pattern. The exposed layer of the powder P is heated by the beam B to a temperature allowing it to melt, flow, and consolidate. This step may be referred to as fusing the powder P.

The build platform 20 is moved vertically downward by the layer increment, and another layer of powder P is applied in a similar thickness. The directed energy source 22 again emits a beam B and the beam steering apparatus 24 is used to steer the focal spot S of the beam B over the exposed powder surface in an appropriate pattern. The exposed layer of the powder P is heated by the beam B to a temperature allowing it to melt, flow, and consolidate both within the top layer and with the lower, previously-solidified layer.

This cycle of moving the build platform 20, applying powder P, and then directed energy melting the powder P is repeated until the entire part 58 is complete.

Once part 58 is complete, platform lift 82 is actuated to lift build platform 20 vertically upward from a seated position, FIG. 2, to an un-seated position, FIG. 3. This is accomplished by moving sliding sleeve 90 vertically upward, thereby by forcing lifting pins 84 vertically upward and causing the securing means 68 to separate and create opening 94 between the build platform 20 and seal 74, exposing the unused powder to vacuum chamber 76. Vacuum pump 96 is activated to provide suction to the vacuum chamber 76 which causes the unused powder contained in the build chamber 46 to flow through the opening 94, into the vacuum chamber 76, and then into powder recovery container 26 for recycling. Chamber shaker 102 may also be activated to shake and/or impart vibrations into the build chamber 46 to help evacuate the powder from the build chamber 46 and into the powder recovery container 26.

With the unused powder removed from the build chamber 46, the vacuum pump 96 is de-activated. The actuator 66 may be activated to raise back to the starting position so that the part 58 attached to the build platform 20 is accessible above the worksurface 50 and can easily be removed while the magnets are separated by the platform lift mechanism 82, or platform rotational engagement disengaged by reverse rotation of the platform. Now, by deactivating the lift 82, a new or reconditioned platform may be snapped or rotated into place and the machine can commence with the next build. To accomplish this, the platform lift 82 is de-actuated and the spring 86 forces the platform lift 82 vertically downward, thereby moving the build platform 20 vertically downward from the un-seated position, FIG. 3, to the seated position, FIG. 2.

The additive manufacturing apparatus described above has several advantages over the prior art. It is compatible with a closed powder handling system, eliminates the need for a large open powder reservoir to make multiple parts, and saves significant labor in handling excess powder after a build cycle.

As noted above, the incorporation of the chamber heater 56 provides the apparatus with thermal control capability. Thermal control allows for a more uniform build and reduces thermally driven defects that occur in prior art larger, multi-part build chambers where maintaining thermal uniformity is more difficult due to large volume of thermal mass with high heat capacity and much longer built time per layer. In those circumstances, heat added to the build volume via the sintering/fusion process becomes more and more a local event relative to the volume size and time constants between laser scans of the same location on successive layers is significantly long to allow sizable thermal interaction with the environment and significant change in thermal state if left uncontrolled.

Controlling chamber temperature during formation can help to maintain thermal aspects of the build cross section relative to the sintering/fusion process and is a key factor in controlling dimensional stability and maintaining relative position of section features as the layers are stacked upon one another. Thermal control of the build volume is essential to ensure that consistent physical attributes and mechanical properties of the finished part are produced. Having thermal control of the build chamber allows the user to maintain the build volume at a desired thermal state that helps to ensure a robust process that can be used for production, and provides high process yield with consistency from part to part.

The foregoing has described an additive manufacturing apparatus and method. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends any novel one, or any novel combination, of the features disclosed in this specification (including any accompanying claims, abstract and drawings), or to any novel one, or any novel combination, of the steps of any method or process so disclosed.

What is claimed is:

1. A method of making a part, comprising the steps of:
   securing a build platform to an actuator which is disposed in a build chamber,
   depositing a powder onto the build platform;
   directing a beam from a directed energy source to fuse the powder;
   moving the actuator vertically downward within the build chamber by a layer increment of powder;
   repeating in a cycle the steps of depositing, directing, and moving to build up the part in a layer-by-layer fashion until the part is complete;
   lifting the build platform away from the actuator to create an opening therebetween; and
   evacuating the powder from the build chamber through the opening.

2. The method of claim 1, further comprising the step of securing the build enclosure to a table having a planar worksurface such that the planar worksurface of the build enclosure is substantially coplanar with the planar worksurface of the table.

3. The method of claim 2, wherein the step of securing the build enclosure to the table further includes the step of positioning resilient spacers between the build enclosure and the table to isolate the build enclosure from the table.

4. The method of claim 2, further comprising the step of using a platform lift to lift the build platform away from the actuator, the platform lift being carried by the actuator and including:
   a sliding sleeve; and
   at least one pin connected to the sliding sleeve and extending upwardly through an opening in the actuator, wherein movement of the sliding sleeve causes the at least one pin to push the build platform away from the actuator.

5. The method of claim 4 further comprising using a lock mechanism to couple together the build platform and the build chamber prior to using the platform lift.

6. The method of claim 5 wherein the lock mechanism comprises the at least one pin having an enlarged head size to fit a T-shaped slot formed in the build platform.

7. The method of claim 2 wherein the build platform is secured to the actuator using magnets.

8. The method of claim 2, wherein a vacuum chamber is defined by an outer wall of the actuator, the method further comprising using a vacuum pump to evacuate the powder through the opening and the vacuum pump.

9. The method of claim 8, further comprising a step of using a shaker to vibrate the build enclosure and aid in the evacuation of powder from the build chamber.

10. The method of claim 1, further comprising removing the build platform from the actuator subsequent to evacuating the powder.

11. A method of making a series of parts, comprising the steps of:
   securing a build platform to an actuator which is disposed in a build chamber,
   executing a build cycle including depositing powder onto the build platform and selectively fusing the powder using directed energy, for a plurality of layers, until the part is complete;
   lifting the build platform away from the actuator to create an opening therebetween;
   evacuating the powder from the build chamber through the opening;
   detaching the build platform from the actuator; and
   repeating the steps of securing, executing a build cycle, lifting, evacuating, and detaching so as to complete at least one subsequent part.

12. The method of claim 11, further comprising the step of securing the build enclosure to a table having a planar worksurface such that the planar worksurface of the build enclosure is substantially coplanar with the planar worksurface of the table.

13. The method of claim 12, wherein the step of securing the build enclosure to the table further includes the step of positioning resilient spacers between the build enclosure and the table to isolate the build enclosure from the table.

14. The method of claim 11, further comprising the step of using a platform lift to separate the build platform from the actuator, the platform lift being carried by the actuator and including:
   a sliding sleeve; and at least one pin connected to the sliding sleeve and extending upwardly through an opening in the actuator, wherein movement of the sliding sleeve causes the at least one pin to push the build platform away from the actuator.

15. The method of claim 14 further comprising using a lock mechanism to couple together the build platform and the build chamber prior to using the platform lift.

16. The method of claim 15 wherein the lock mechanism comprises the at least one pin having an enlarged head size to fit a T-shaped slot formed in the build platform.

17. The method of claim 11 wherein the build platform is secured to the actuator using magnets.

18. The method of claim 11, wherein a vacuum chamber is defined by an outer wall of the actuator, the method further comprising using a vacuum pump to evacuate the powder through the opening and the vacuum pump.

19. The method of claim 18, further comprising a step of using a shaker to vibrate the build enclosure and aid in the evacuation of powder from the build chamber.

20. The method of claim 11, wherein subsequent build platforms are re-conditioned platforms.

* * * * *